United States Patent [19]

McGuire et al.

[11] 4,424,264

[45] Jan. 3, 1984

[54] MULTICELL ELECTRIC STORAGE BATTERIES

[75] Inventors: Michael E. McGuire, Clifton; Edwin Tatlock, Bolton, both of England

[73] Assignee: Chloride Group Public Limited Company, London, England

[21] Appl. No.: 469,695

[22] Filed: Feb. 25, 1983

[30] Foreign Application Priority Data

Jun. 10, 1982 [GB] United Kingdom ............... 8216841

[51] Int. Cl.$^3$ .............................................. H01M 2/30
[52] U.S. Cl. .................................................. 429/179
[58] Field of Search ........................ 429/179, 178, 175

[56] References Cited

U.S. PATENT DOCUMENTS 3,605,065 9/1971 Shannon ........................ 429/179 X

*Primary Examiner*—Anthony Skapars
*Attorney, Agent, or Firm*—Oblon, Fisher, Spivak, McClelland & Maier

[57] ABSTRACT

A multicell electric storage battery includes a rectangular section container containing a plurality of cells extending along the length of the container. A lid is common to all the cells and has a depending skirt which is sealed to the container. The battery has two top terminals extending through the lid and situated on the central longitudinal axis of the lid and two side terminals which are connected to a respective plate strap by a respective connector member which passes through and is sealed to the walls of a housing which projects upwardly from the lid and whose interior is sealed from the interior of the battery and one of whose outwardly facing side walls carries a side terminal.

4 Claims, 3 Drawing Figures

MULTICELL ELECTRIC STORAGE BATTERIES

The present invention relates to multicell electric storage batteries, particularly lead acid automotive batteries, and is concerned with the disposition and construction of the terminals of such batteries.

Conventional automotive batteries are provided with an upstanding terminal, commonly of lug or pillar construction, in each of two corners of the rectangular battery lid, usually separated by one of the longer sides of the lid. Automotive batteries must be connected up with the correct polarity and to ensure that this is not done incorrectly car manufacturers generally provide trailing terminal connections which are no longer than strictly necessary. This means that in practice there are "left handed" and "right handed" batteries which are identical save for the reversal of the polarity of their terminals and battery manufacturers have been obliged to produce both sorts to satisfy the demands of car manufacturers. It has been proposed that batteries should be provided with centre terminals, that is to say terminals disposed on the longitudinal centre line of the lid, thereby getting rid of the "handedness" of the batteries.

It is also known, primarily in the United States of America, to provide batteries with side terminals rather than upstanding terminals, that is to say terminals in the side wall of the battery rather than on its lid but this necessitates the manufacture of a further type of battery differing only in the disposition of its terminals which is expensive in tooling and stockholding costs. A further disadvantage of batteries with side terminals is that the seals at the point where the terminals pass out of the battery to the atmosphere are lower than in batteries with terminals in its lid and thus tend to be washed or splashed with electrolyte and therefore are more prone to leakage.

According to the present invention a multicell electric storage battery includes a rectangular section container containing a plurality of cells extending along the length of the container and a lid common to all the cells having a peripheral side wall sealed to the container, the battery having two top terminals extending through the lid and situated on the central longitudinal axis of the lid and two side terminals extending through the side wall of the lid. Thus the battery in accordance with the present invention has both two central top terminals and two side terminals and will thus be usable in circumstances requiring a "left handed" battery with top terminals, a "right handed" battery with top terminals and a battery with side terminals thus avoiding the necessity of having to make two or even three different batteries differing only in the disposition of their terminals thereby achieving a substantial saving in tooling and stockholding costs.

Preferably the battery is of recombination type, adjacent electrodes in each cell being separated by separators of fibrous absorbent separator material and each cell containing substantially no free unabsorbed electrolyte. By providing substantially no free unabsorbed electrolyte, the problem referred to above, namely the tendency of side terminals to leakage of electrolyte, is minimised because there is effectively no free electrolyte available for leakage.

By virtue of the fact that all four terminals are provided in the lid, any additional complexity of the battery is substantially restricted to the lid and in addition the fact that the side terminals are relatively high and preferably above the level of the plates and separators further reduces the tendency of electrolyte to leak around the seals sealing the side terminals in the side wall of the lid.

The preferred embodiment includes a housing sealed from the interior of the battery associated with each side terminal and partially defined by the side wall of the lid, each side terminal being sealed in the said side wall of the associated housing and connected to the associated plate strap in an end cell of the battery by a connector member which passes through and is sealed to a further wall of the associated housing. Thus in this embodiment each side terminal is provided with two separate electrolyte seals, one at the point where the side terminal passes through the side wall of the lid and the other in another wall of the sealed housing thereby further minimising any risk of electrolyte leakage around the side terminals.

In the most preferred embodiment of the invention the lid includes a substantially planar floor through which the top terminals extend and are sealed thereto and which carries two upstanding housings sealed from the interior of the battery and partially defined by the said planar floor and the peripheral side wall of the lid, the connector members extending substantially horizontally from the side terminals within the associated housing and then substantially vertically through the said planar floor.

A battery provided with two upstanding sealed housings with a side terminal associated with each and sealed to two walls of the housing is believed to be novel per se and thus according to a further aspect of the present invention a battery includes a container and a lid having a peripheral side wall sealed thereto, the lid having a substantially planar floor and carrying two upstanding housings sealed from the interior of the battery and partially defined by the said planar floor and the peripheral side wall of the lid and connector members connected to respective associated plate straps in end cells of the battery and extending substantially vertically through the planar floor into a respective housing and then substantially horizontally and are connected to side terminals in the said side wall of the lid.

Further features and details of the invention will be apparent from the following description of one specific embodiment which is given by way of example only with reference to the accompanying drawings, in which.

Figure 1:
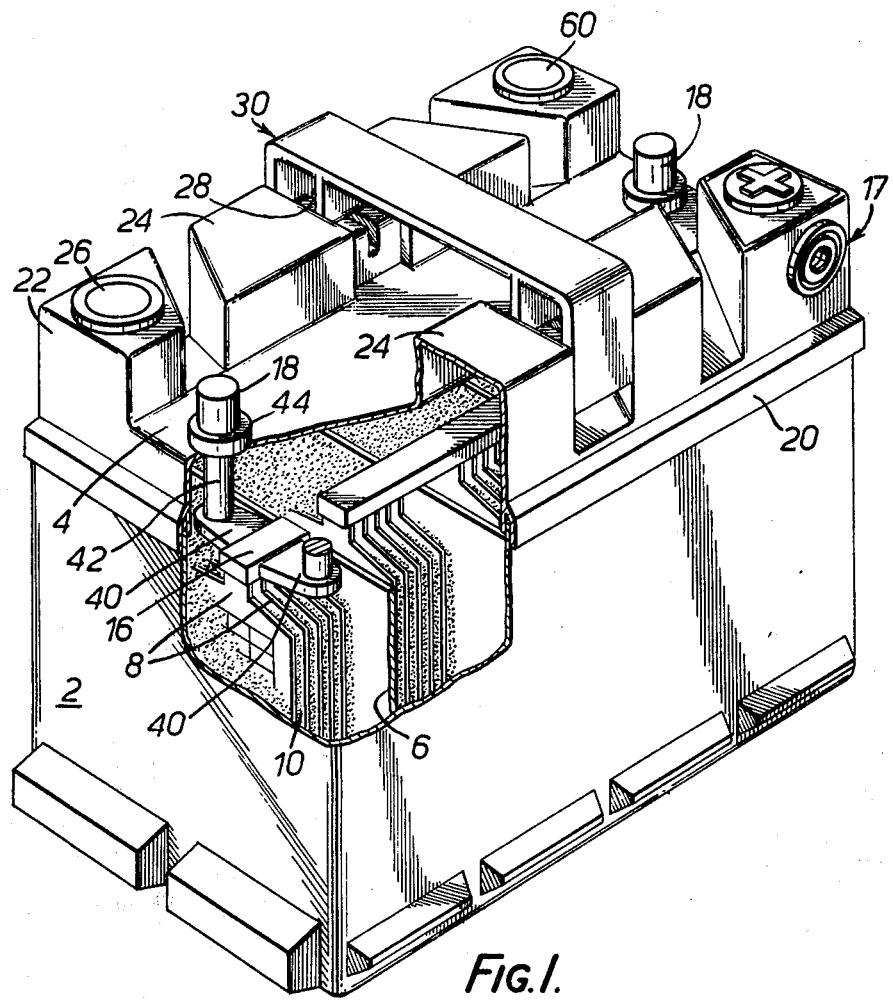
FIG. 1 is a partly cut-away perspective view of a 12 volt lead acid recombinant automotive battery in accordance with the present invention.

The battery shown in FIG. 1 has a rectangular, box-like container 2 closed by a lid 4, each being formed from polypropylene or similar plastics material. The container is divided along its length into six equally sized cells by five integral intercell partitions 6 which do not extend up as far as the lid 4. Each cell contains alternating positive and negative plates 8 interleaved with highly absorbent microfine glass fibre separator material 10 (not shown in FIG. 2), and contains a reduced amount of electrolyte such that there is substantially no free unabsorbed electrolyte. As mentioned above, the battery is of recombinant type, that is to say the gases evolved during operation or charging are substantially induced to recombine within the battery and are not vented to the atmosphere. Each plate has an upwardly projecting plate lug and the plate lugs of the same polarity in each cell are connected together by a plate strap 16, as is conventional. One plate strap 16 in each end cell is connected to a respective side terminal 17 and a top terminal 18 projecting through the lid 4, as will be described in more detail below. The remaining plate straps extend over one intercell partition and connect together the positive lugs in one cell and the negative lugs in the adjacent cell and thus constitute intercell connectors.

The lid 4 is a one-piece moulding having a depending skirt 20 which is firmly welded or otherwise secured to the upper edge of the container 2. The lid 4 has a generally planar upper surface, constituted by what may be termed a floor, upstanding from which are six formations comprising four corner formations 22 situated at the corners of the lid and two elongate edge formations 24 extending along two opposed side edges of the lid and spaced from the associated corner formations 22. The upper surfaces of the six formations are flat and substantially coplanar, but each corner formation is provided with a shallow circular projection 26 on its upper surface and each edge formation is provided with a shallow transverse recess 28 on its upper surface, the function of which will be described below.

The battery is provided with a rectangular U-section carrying handle 30 which is movable vertically between the position illustrated in FIG. 1 in which it may be used to carry the battery and a position in which its upper and side surfaces are flush with those of the edge formations 24. This handle forms no part of the present invention and will therefore not be described in more detail.

Each plate strap 16 in the end cells which is connected to the battery terminals is provided with two oppositely directed, horizontally extending integral transverse lugs 40, upstanding from the free end of each of which is a terminal pillar 42. The inner terminal pillar 42 is situated on the longitudinal centre line of the battery and passes upwardly through the floor of the lid 4 where it is sealed in position by an insert 44 of lead or lead alloy. The outer terminal pillar 42 is connected to a side terminal 17, as will be described in more detail below.

Figure 2:
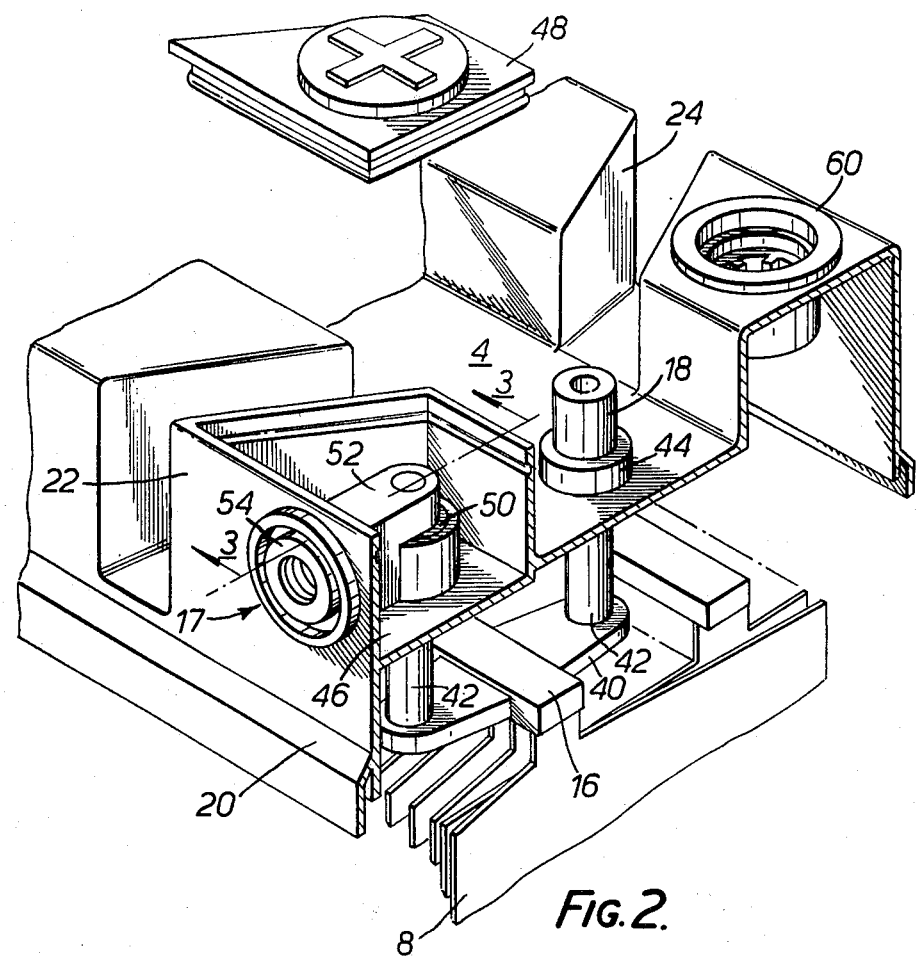
FIG. 2 is an enlarged perspective scrap view of part of the battery showing the terminal construction in more detail.

As mentioned above, the battery lid is provided with four upstanding corner formations 22, two of which are open-bottomed, as may be seen on the right-hand side of FIG. 2. The other two corner formations have a bottom constituted by a wall 46 coplanar with the floor of the lid 4 and a lid 48 which is not integral with the corner formation but may be secured in position, as by glueing, to form a housing defining a sealed compartment. The outer terminal pillar 42 passes through the floor of the compartment 46 and is there sealed against the passage of electrolyte by an insert 50 of lead or lead alloy. This insert is connected within the compartment by a horizontal connector member 52 integral with it and integral with a further insert 54 set in and sealed to an outwardly facing wall of the compartment. The insert 54 affords a blind circular recess accessible from the exterior of the battery within which is a threaded insert 56 of hard metal adapted to receive a threaded terminal bolt forming part of the terminal connection system of, for instance, a car electrical system.

Figure 3:
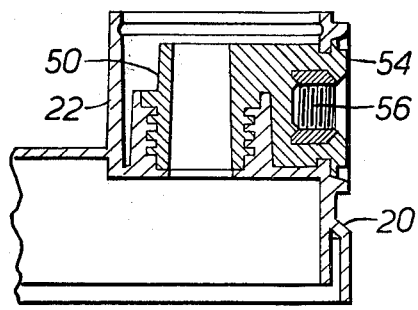
FIG. 3 is a scrap end sectional elevation showing the construction of the side wall terminal prior to connection to the plate strap in the associated end cell of the battery.

Thus, when assembling the battery the electrodes are placed in their respective cells, prior to or after which the plate straps 16, lugs 40 and upstanding terminal pillars are cast in position. A lid is provided having two annular metal inserts 44 provided on its longitudinal centre line in the conventional manner, that is to say with the material of the lid injection moulded around these inserts. Two of the upstanding corner formations 22 are formed without lids, and these formations are provided with a single composite insert comprising the portion 50 passing through the floor 46 of the housing and the further insert portion 54 integral with it which extends through a side wall of the housing. The configuration of the insert in the two corner formations 22 prior to connection of the lid to the battery container is best seen in FIG. 3. The lid is then placed in position on the battery container with the two inner terminal posts 42 passing up through the central inserts 44 and the two outer terminal posts 42 passing up into the inserts 50 within the compartments defined by the two open-topped corner formations 22. The lid is firmly connected to the container, for instance by the method known as hot plate welding which is known per se.

A mould of known type is then placed around each of the central terminal pillars 42 above the lid and molten lead is poured into it to connect the terminal pillar to the insert 44 thereby forming the centre terminals 18. The outer terminal pillars 42 are dimensioned to extend nearly as high as the inserts 50 in which they are accommodated, and these two are connected together merely by the application of heat, e.g. by means of a welding torch, and optionally also by the addition of further lead. The assembly is then completed by connecting two lids 48 in a permanent manner to the two open-topped corner formations 22, for which purpose these two may be provided with complementary ribs and grooves. The battery is then filled with electrolyte, which in this case is effected through a single filling and venting aperture 60 provided in one of the other corner formations 22 in place of one of the circular projections 26. This aperture is generally closed by a removable lid which is omitted from FIG. 2 for the sake of clarity.

Thus the battery in accordance with the present invention has a positive centrally disposed top terminal, a positive side terminal disposed in a side surface of the lid and corresponding terminals of negative polarity. The two top terminals are sealed in a conventional manner, that is to say by sealing them to a preformed insert set in the lid whilst the risk of electrolyte leakage around the side terminals is minimised firstly by the fact that it is provided with two separate seals in two walls of a sealed compartment, secondly by the fact that they are in a side surface of the lid rather than a side surface of the container with the result that they are well above the separators and electrodes which are wet with electrolyte and thirdly because there is in any event a restricted amount of electrolyte and thus substantially no free electrolyte available for leakage.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A multicell electric storage battery including a rectangular section container, a plurality of cells extending along the length of said container and a lid common to all said cells, said lid having a peripheral side wall which is sealed to said container, said battery having two top terminals extending through said lid and situated on the central longitudinal axis of said lid and two side terminals extending through said side wall of said lid.

2. A battery as claimed in claim 1 which is of recombinant type, each cell comprising a plurality of electrodes and a plurality of separators of fibrous absorbent separator material spacing adjacent electrodes apart and each cell containing substantially no free unabsorbed electrolyte.

3. A battery as claimed in claim 1 including a plurality of plate straps respectively connecting together electrodes of the same polarity in each said cell wherein said lid includes a plurality of walls associated with each said side terminal, said walls defining a housing sealed from the interior of said battery, one of said plurality of walls defining each of said two housings being constituted by a part of said side wall of said lid, each side terminal being sealed in the respective said one of said plurality of walls, each end cell of said battery including a connector member connecting one of said side terminals to a said plate strap in said end cell and passing through a further wall of the associated housing and being sealed thereto.

4. A battery as claimed in claim 3 wherein the lid includes a substantially planar floor through which said top terminals extend and are sealed thereto and which carries said two housings which are sealed from the interior of said battery and partially defined by said planar floor and said peripheral side wall of said lid, said connector members extending substantially horizontally from said side terminals within the said associated housing and then substantially vertically through said planar floor.

* * * * *